Figures 1, 2:
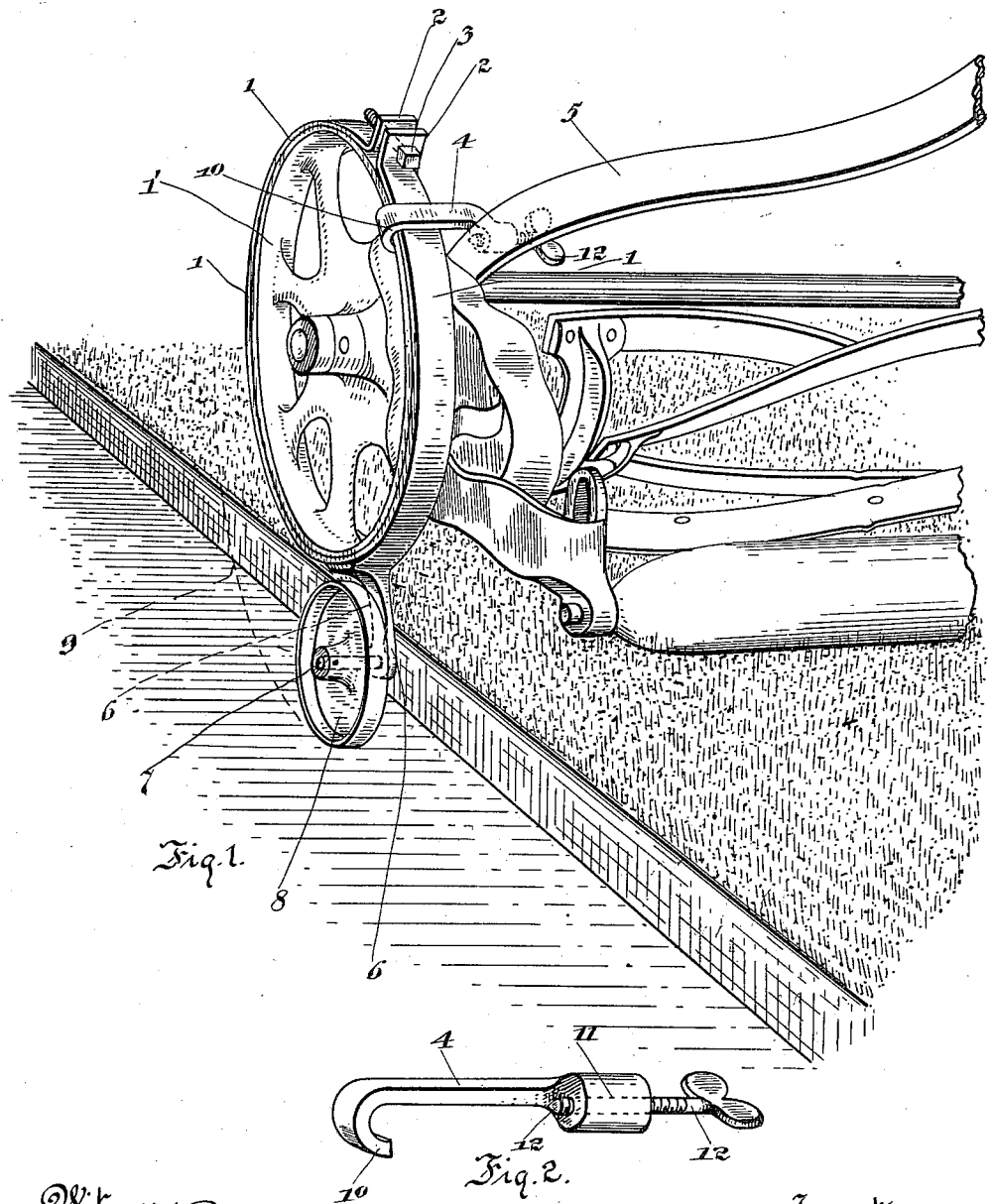

A. G. TULANE.
LAWN MOWER.
APPLICATION FILED DEC. 3, 1910.

1,006,807.

Patented Oct. 24, 1911.

Witnesses
W. T. Smith
E. E. Wessels.

Inventor
Axel G. Tulane,
by Joshua R. H. Potts
his Attorney.

UNITED STATES PATENT OFFICE.

AXEL G. TULANE, OF CHICAGO, ILLINOIS.

LAWN-MOWER.

1,006,807. Specification of Letters Patent. Patented Oct. 24, 1911.

Application filed December 3, 1910. Serial No. 595,454.

*To all whom it may concern:*

Be it known that I, AXEL G. TULANE, a subject of the King of Sweden, and a resident of the city of Chicago, county of Cook, and State of Illinois, have invented certain new and useful Improvements in Lawn-Mowers, of which the following is a specification.

My invention relates to improvements in lawn mowers and more particularly to an attachment therefor, the object being to provide means whereby an ordinary lawn mower may efficiently cut the grass at the edge of a lawn.

A further object of my invention is to provide an attachment of the character stated which shall be simple of construction and economical of production.

Other objects will appear hereinafter.

With these objects in view my invention consists in the novel construction and arrangements of parts as will be hereinafter fully described and more particularly pointed out in the appended claims.

My invention will be best understood by reference to the accompanying drawing forming a part of this specification, and in which—

Figure 1 is a perspective view of my improved lawn mower attachment, and Fig. 2 is a detail perspective view showing a clamp employed in the attachment.

The preferred form of my invention as illustrated in the accompanying drawing comprises a flexible metallic band 1 which is adapted to surround a driving wheel of the lawn mower as clearly illustrated in Fig. 1. The ends of the band 1 are bent at right angles to the main portion thereof and are connected by means of a clamping screw 3. The band 1 is thus adjustably secured to the periphery of the wheel 1' and the same may have any angular position thereon. In order to prevent the driving wheel 1' from rotating on its journal a clamp 4 is provided which connects said driving wheel with the bail 5 of the lawn mower. Extending radially from the band 1 is an arm 6 which carries a laterally extending journal 7 on which is rotatably mounted a traction wheel 8. By means of the clamping screw 3 the wheel 8 may be revolved in a direction as indicated by dotted lines in Fig. 1, thus varying the distance between the driving wheel 1' and the surface of the ground. In this manner the height of the grass cut at the edge of the lawn is varied.

The clamp 4 comprises a hook 10 formed at one end thereof and an enlargement 11 at the other end thereof, and arranged in a plane at right angles to said hook, said enlargement carrying a longitudinally disposed thumb screw 12 as shown in Fig. 2. The end of the thumb screw 12, which is adapted to contact with the handle 5, as indicated in Fig. 1, is conical thereby preventing slippage.

From the foregoing construction it is apparent that an ordinary lawn mower may be readily changed for trimming the grass at the edge of a lawn, the supplemental wheel provided in the attachment having a vertical adjustment for varying the height of the grass cut, as aforesaid.

A lawn mower attachment of the construction set forth is not only useful but economical of construction.

While I have shown what I deem to be the preferred construction for carrying my invention into effect, I do not wish to be limited thereto as there might be various changes made in the details of construction and arrangements of parts described without departing from the spirit of the invention. Hence, I desire to avail myself of such variations and modifications as come within the scope of the appended claims.

Having described my invention what I claim as new and desire to secure by Letters Patent is:—

1. A lawn mower attachment comprising a clamping member adapted to be secured to one of the traction wheels of a mower; a supplemental wheel carried by said clamping member; and means for securing said traction wheel against rotation, substantially as described.

2. A lawn mower attachment comprising a flexible band adapted to be secured to one of the traction wheels of a mower, the ends of said band being bent outwardly and connected by a clamping screw, a supplemental wheel carried by said band; and means for securing said traction wheel against rotation, substantially as described.

3. A lawn mower attachment comprising a flexible band adapted to be secured to one of the traction wheels of a mower, the ends of said band being bent outwardly and connected by a clamping screw, a supplemental wheel carried by said band; and a clamp adapted to engage said traction wheel and a portion of the mower to prevent rotation of said traction wheel, substantially as described.

In testimony whereof I have signed my name to this specification in the presence of two subscribing witnesses.

AXEL G. TULANE.

Witnesses:
ARTHUR A. OLSON,
JOSHUA R. H. POTTS.

Copies of this patent may be obtained for five cents each, by addressing the "Commissioner of Patents, Washington, D. C."